US008045031B2

(12) United States Patent
Cieslinski

(10) Patent No.: US 8,045,031 B2
(45) Date of Patent: Oct. 25, 2011

(54) IMAGE SENSOR AND READOUT METHOD

(75) Inventor: Michael Cieslinski, Unterhaching (DE)

(73) Assignee: Arnold & Richter Cine Technik GmbH & Co. Betriebs KG, Munich (DE)

( * ) Notice: Subject to any disclaimer, the term of this patent is extended or adjusted under 35 U.S.C. 154(b) by 490 days.

(21) Appl. No.: 12/138,008

(22) Filed: Jun. 12, 2008

(65) Prior Publication Data

US 2008/0309809 A1 Dec. 18, 2008

(30) Foreign Application Priority Data

Jun. 14, 2007 (DE) .......................... 10 2007 027 463

(51) Int. Cl.
H04N 5/335 (2011.01)
(52) U.S. Cl. .................... 348/308; 348/294; 348/323
(58) Field of Classification Search .................. 348/321, 348/323
See application file for complete search history.

(56) References Cited

U.S. PATENT DOCUMENTS

| | | | |
|---|---|---|---|
| 5,790,191 A | 8/1998 | Zhang | |
| 6,787,752 B2 | 9/2004 | Tsai | |
| 6,911,641 B2 | 6/2005 | Tsai | |
| 6,953,923 B2 * | 10/2005 | Yang et al. | 348/308 |
| 7,408,683 B2 * | 8/2008 | Sato et al. | 348/302 |
| 7,728,891 B2 * | 6/2010 | Hiyama et al. | 348/308 |
| 7,808,539 B2 * | 10/2010 | Matsutani | 348/316 |
| 2002/0154347 A1 | 10/2002 | Funakoshi et al. | |
| 2003/0052982 A1 | 3/2003 | Chieh | |
| 2004/0041931 A1 | 3/2004 | Tu et al. | |
| 2006/0231732 A1 | 10/2006 | Yan | |
| 2006/0268137 A1 | 11/2006 | Myers | |
| 2010/0026814 A1 * | 2/2010 | Shimoda | 348/308 |

OTHER PUBLICATIONS

German Search Report dated Mar. 31, 2008. DE 10 2007 027 463.9. 9 pages.

* cited by examiner

*Primary Examiner* — Luong T Nguyen
(74) *Attorney, Agent, or Firm* — Gifford, Krass, Sprinkle, Anderson & Citkowski, P.C.

(57) ABSTRACT

The invention relates to an image sensor, in particular a CMOS image sensor, for electronic cameras, having a plurality of light sensitive pixels arranged in rows and columns and a number of output amplifiers. The image sensor is made such that the order in which the pixels are switched to the output amplifiers is varied with respect to the order in which the pixels are arranged along a row of the image sensor.

13 Claims, 4 Drawing Sheets

IMAGE SENSOR AND READOUT METHOD

CROSS-REFERENCE TO RELATED APPLICATIONS

This application claims priority of German Patent Application No. 10 2007 027 463.9 filed Jun. 14, 2007.

FIELD OF THE INVENTION

The present invention relates to an image sensor, in particular to a CMOS image sensor, for electronic cameras, having a plurality of light sensitive pixels arranged in rows and columns, furthermore having a number of output amplifiers, furthermore having a switching device for selectively switching the pixels of one of the rows to the output amplifiers and having a control device for controlling the switching device.

BACKGROUND OF THE INVENTION

Known electronic cameras include an image sensor which comprises a plurality of light sensitive elements or pixels which are arranged in rows and columns and which convert light incident through a lens of the camera into electrical signals. For the reading out of an image, each of the pixels is addressed and a signal which is proportional to a charge of the pixel collected by an exposure is directed to an output of the image sensor.

In cameras which simultaneously have a high number of light sensitive elements and a high frame rate, image sensors are used which have a plurality of outputs which can be read out in parallel—and thus faster—in a respective readout cycle. In addition, the columns can be divided into column groups which each have a plurality of columns, with the number of the columns in each of the column groups corresponding to the number of the outputs.

In this connection, the rows are associated with the outputs of the image sensor in the manner of unit matrices disposed next to one another so that the columns with the numbers n, n+a, n+2a, etc. are each associated with the output with the number n, with the columns and the outputs each being numbered continuously.

With an image sensor with 32 outputs and with a division of the columns into column groups, for example, in a first readout cycle, the 1st column of the image sensor which corresponds to the 1st column of the 1st column group is thus associated with the 1st output. The 2nd column of the image sensor which corresponds to the 2nd column of the 1st column group is associated with the 2nd output, etc. up to the 32nd column of the image sensor which corresponds to the 32nd column of the 1st column group which is associated with the 32nd output. In the following readout cycle, the 33rd column of the image sensor which corresponds to the 1st column of the 2n column group is again associated with the 1st output; the 34th column of the image sensor which corresponds to the 2nd column of the 2nd column group is again associated with the 2nd output, etc.

Each of the outputs of the image sensor has its own output amplifier, with the signals of the pixels being amplified by the output amplifier in order subsequently to be digitized. The signals are applied to the output amplifiers as analog electrical voltages which correspond to the collected charges.

The reading out of such an image sensor usually takes place row-wise, i.e. row for row. Within the respectively selected line, the signals of the associated pixels are switched to the outputs of the image sensor via corresponding control signals column-wise, i.e. column for column, or optionally column-group-wise, i.e. column group for column group, with the readout starting at a 1st column or column group located at an edge of the image sensor and being continued in increasing order with the respective directly adjacent column or column group, i.e. according to the arrangement order of the columns or column groups. It follows from this that the signals of the pixels of the 1st, 33rd, 65th, etc. column of the image sensor are output sequentially at the 1st output or at the 1st output amplifier respectively, that the signals of the pixels of the 2nd, 34th, 66th, etc. column of the image sensor are output at the 2nd output or 2nd output amplifier respectively, etc.

A strictly regular order is thus provided with known image sensors in which the signals of the pixels are switched to the output amplifier.

It is known that the respective signal currently applied at an output amplifier always includes a small portion, disposed in the per thousandth range, of the signal directly amplified beforehand by the respective output amplifier, said portion being caused, for example, by thermal effects and/or feedback effects on the power supply. Suitable circuits and calculation methods are known to counter the disturbing influence of the signal of the predecessor pixel. A complete compensation is, however, not possible.

If the image sensor only has one single output, and thus only one output amplifier, the signals of all the pixels are amplified by the same output amplifier, with the signals of pixels arranged directly next to one another being amplified directly sequentially such that the portion of the signal of the respective predecessor pixel is effective in the signal of the pixel arranged directly adjacent to the respective predecessor pixel. This admittedly generates a kind of blur in the image with large difference between two signals amplified directly after one another. However, this is not perceivable by the eye.

If the image sensor, however, has a plurality of outputs, as has been explained by way of example above, the portion of the signal of the respective predecessor pixel—that is the portion of the signal amplified directly beforehand—makes itself noticeable in the amplification of the signal of that pixel which is arranged remote from the predecessor pixel by the number of outputs. The signals of the pixels arranged between the predecessor pixel and the pixel remote from the predecessor pixel by the number of outputs are namely amplified by the output amplifiers of the other outputs. For example, in an image which shows a bright candle flame in an otherwise dark room, a visual echo of the candle flame is generated which is laterally offset from the original candle flame. Such an image interference is called a ghost image. In the example chosen, the ghost image is particularly easily visible since the echo occurs in a dark region. For example, with an image sensor having 32 outputs, the echo is offset from the original by 32 pixels.

SUMMARY OF THE INVENTION

It is the underlying object of the invention to provide an image sensor of the initially named kind which enables the occurring of ghost images to be suppressed.

This object is satisfied by an image sensor having the features of claim 1, and in particular in that the order in which the pixels are switched to the output amplifiers is varied with respect to the order in which the pixels are arranged along a row of the image sensor.

With the image sensor in accordance with the invention, the signals of the pixels of a row can also be read out column-group-wise, i.e. the signals of the pixels of a column group of the respective row can be read out together in a respective readout cycle or the signals of the pixels of a row are read out column-wise.

The signals of the pixels are switched to the individual output amplifiers by a corresponding control of the switching device in accordance with such a spatial or temporal order from column to column or optionally within a respective column group (i.e. within a readout cycle) or optionally from column group to column group (i.e. from readout cycle to readout cycle), said order being different with respect to the order in which the pixels are arranged along the respective row of the image sensor.

It is hereby ultimately achieved that the spatial spacing of the pixels whose signals are switched sequentially to a specific one of the plurality of output amplifiers is varied. This change in the switching order or of the pixel spacing takes place at least for a plurality of output amplifiers, preferably for all the output amplifiers. The initially explained ghost images are hereby scrambled into one another so that they are no longer perceivable by the eye.

In accordance with an advantageous embodiment, the columns are divided into a plurality of column groups and the number of output amplifiers corresponds to the number of columns of a column group, with the columns of each column group being associated with the output amplifiers in accordance with an association order and with a plurality of mutually different association orders being provided for the plurality of column groups. In other words, the orders in which the columns (and thus the pixels) of a respective column group are associated with the output amplifiers differ for the plurality of column groups. The association of the individual columns of a respective column group with the output amplifiers of the image sensor thus does not take place, or does not take place exclusively, in accordance with the manner of a unit matrix explained above.

A respective association order is preset, for example, by the distribution of association points at which a column of the image sensor is linked or linkable to a respective horizontal output line of a signal bus, said output line in turn being switchable to a specific one of the plurality of output amplifiers of the image sensor. These association points are either fixedly preset (by a permanent electrical connection between the respective column line and the respective output line). Or selectively variable association points are provided, with a respective switch being arranged at the respective association points.

At least some of the column groups preferably have mutually different association orders. The association order of the columns of a column group with the output amplifiers is therefore different from the association order of the columns of another column group with the output amplifiers. The association orders of all column groups can in particular be different from one another.

It is in particular possible that different association orders are provided for respective adjacent column groups. For example, the odd-number column groups of the image sensor can have a first association order and the even-number column groups can have a second association order, with the first and second association orders being different from one another. A sufficient scrambling of ghost images can hereby be achieved in cases in which the arrangement order of the column groups corresponds to the readout order of the column groups.

In accordance with an embodiment of the invention, a plurality of signal buses are provided which each include a number of output lines which corresponds to the number of output amplifiers, with the signal buses in particular being able to be selectively switched to the output amplifiers by means of a switching device made as a multiplexer device. High settling times can hereby be accepted with small signal bandwidths in order nevertheless to achieve high readout rates. The output lines of the signal buses are provided for the purpose of connecting the output amplifiers to the columns of the column groups. For example, the control device can be made to control the switching device such that two column groups sequentially switched to the output amplifiers are switched to the output amplifiers via different ones of the signal buses.

Some or all of the column groups are in particular associated with a plurality of or all of the signal buses, with the association orders being different for the respective signal buses within each such column group. It is in particular hereby made possible for the association order to be varied from row to two within a column group. For this purpose, the columns of the respective column group can be switched to different signal buses from row to row. A further scrambling can hereby be achieved.

A further scrambling can be achieved if the control device is made to control the switching device such that the signal buses are switched to the output amplifiers from row to row in different orders.

In accordance with a further development, the image sensor can be read out completely using a readout sequence, with the image sensor, however, having more signal buses than are actually required for the reading out of a regular readout sequence. A signal bus redundant with respect to a complete readout is consequently provided. If, for example, the image sensor has 5 signal buses, but only 4 signal buses are required for the reading out, a bus association order can thus be used, if one of the signal buses is defective, in which the defective signal bus is not used.

In accordance with a further embodiment, and indeed alternatively or additionally to the different spatial association orders, the image sensor is controlled such that the chronological readout order, according to which the column groups are sequentially connected to the output amplifiers, is different from the arrangement order, according to which the column group are arranged next to one another in the direction of a row, with the columns being divided into a plurality of column groups and the number of output amplifiers corresponding to the number of columns of a column group. In other words, the different column groups are not switched to the output amplifiers in the same order in which the column groups are arranged next to one another.

A ghost image whose original extends over a plurality of column groups is, for example, hereby also divided along the borders of the column groups, with the individual parts of the ghost image being able to appear scrambled at different positions within the image such that the ghost image can no longer be perceived by the eye. It is particularly effective for the variation of the chronological order of the reading out of the column groups to be combined with the explained variation of the spatial association order of the columns to the output amplifiers.

If there is no division into column groups, the columns can also be arranged in accordance with an arrangement order relative to one another and the control device can be made to control the switching device such that the columns are switched for each row in accordance with a respective readout order sequentially to the output amplifiers, with the readout order of the columns being different from the arrangement order of the columns.

This scrambling can furthermore be improved in the two aforesaid cases in that the readout order is also varied from row to row.

In accordance with a further embodiment, the image sensor has at least one signal bus, each of which includes a number of output lines which corresponds to the number of output amplifiers, with the columns being able to be connected to a plurality of or all of the output lines of the at least one signal bus at preset association points. This enables any desired association of the columns with the output amplifiers. A defective output can hereby also be bypassed.

The invention also relates to a corresponding method for the reading out of an image sensor, in particular of an CMOS image sensor, for electronic cameras.

A non-restrictive embodiment of the invention, which illustrates a combination of a plurality of measures for the scrambling of a ghost image, is shown in the drawing and will be described in the following.

BRIEF DESCRIPTION OF THE DRAWINGS

There are shown, schematically in each case.

DETAILED DESCRIPTION OF THE PREFERRED EMBODIMENTS

Figure 1:
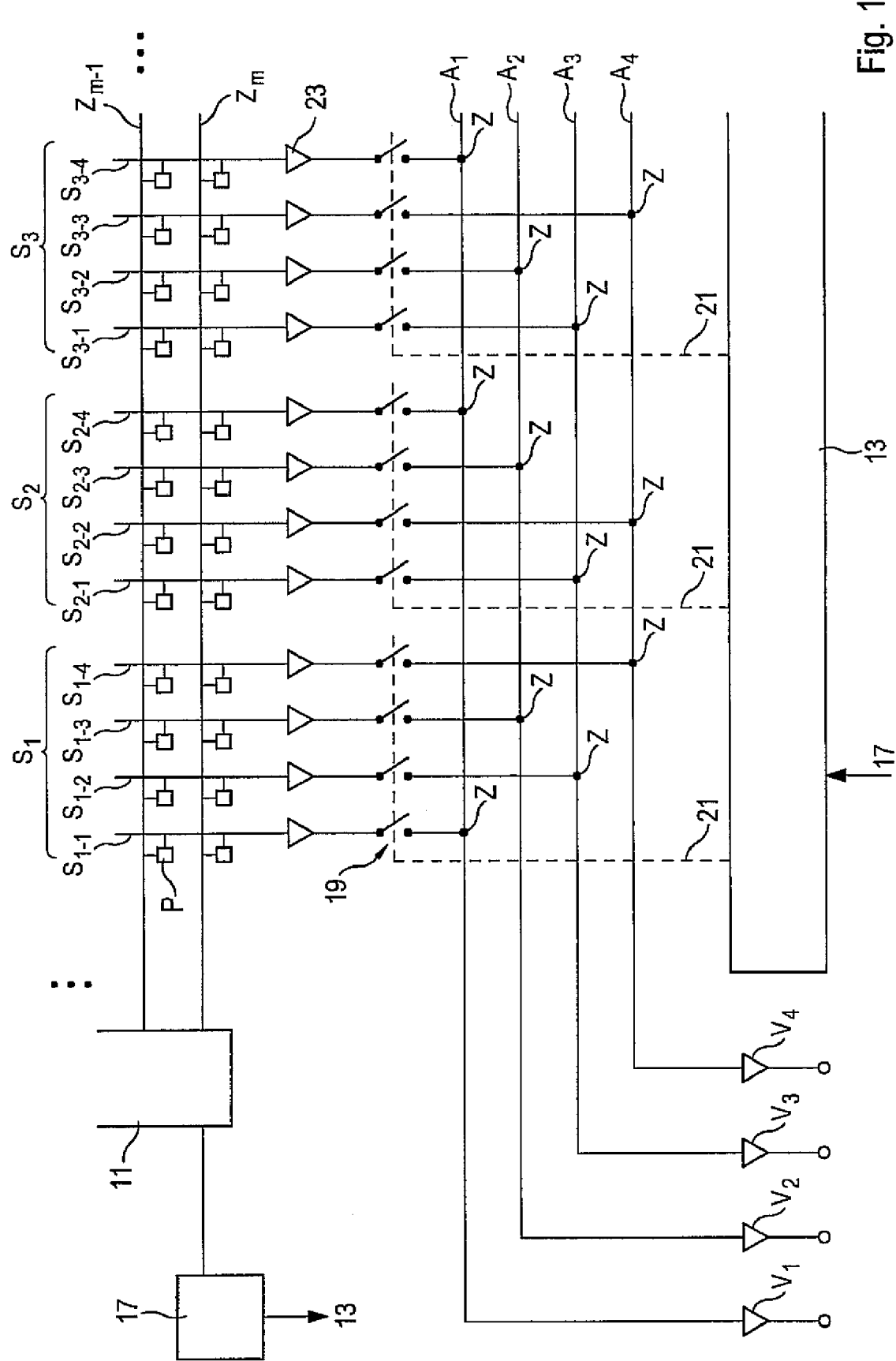
FIG. 1 a first embodiment of an image sensor in accordance with the invention.

The image sensor shown in FIG. 1 has a plurality of light sensitive pixels P which are arranged in rows (shown horizontally here) and columns (shown vertically here). For reasons of clarity, only of the pixels P is provided with a reference symbol. Each row has a row selection line . . . , $Z_{m-1}$, $Z_m$ for the pixels P associated with the respective row and each columns comprises a column line $S_{1-1}$, . . . , $S_{1-4}$, $S_{2-1}$, . . . , $S_{2-4}$, . . . for the pixels P associated with the respective column. The column lines $S_{1-1}$, . . . , $S_{1-4}$, $S_{2-1}$, . . . , $S_{2-4}$, . . . are divided into column groups $S_1$, $S_2$, . . . which each include four column lines $S_{1-1}$, . . . , $S_{1-4}$, $S_{2-1}$, . . . , $S_{2-4}$, . . . .

The image sensor furthermore includes a row selection circuit 11 by which a respective one of the rows . . . , $Z_{m-1}$, $Z_m$ can be selected for the reading out of the signals of the pixels P of this line . . . , $Z_{m-1}$, $Z_m$. A column selection circuit 13 is furthermore provided by which a respective one of the plurality of column groups $S_1$, $S_2$, . . . can be selected for the reading out of the signals of the pixels P of this column group $S_1$, $S_2$, . . . . For this purpose, a separate column selection switch 19 (of which only one is provided with a reference numeral) is provided for each of the column lines $S_{1-1}$, . . . , $S_{1-4}$, $S_{2-1}$, . . . , $S_{2-4}$, . . . , with the column selection switch 19 of each column group $S_1$, $S_2$, . . . being controllable via a common column selection line 21 by the column selection circuit 13 so that the column selection switches 19 of each column group $S_1$, $S_2$, . . . are each switchable together. A separate column amplifier 23 is connected before each of the column selection switches 19. The line selection circuit 11, the column selection circuit 13, the column selection switches 19, the column selection control lines 21 as well as optionally a bus selection circuit, a bus selection switch and a bus selection control line, which will be explained in more detail in the following, form part of a switching device of the image sensor which is controlled by a control device, for example by a microcontroller 17.

The image sensor furthermore has a signal bus which in the example shown here includes four output lines $A_1$, $A_2$, $A_3$, $A_4$ to which the signals of the pixels of a row . . . , $Z_{m-1}$, $Z_m$ of a column group $S_1$, $S_2$, . . . can be switched, with each of the output lines $A_1$, $A_2$, $A_3$, $A_4$ being connected to their own output amplifier $V_1$, $V_2$, $V_3$, $V_4$.

In this connection, each column line $S_{1-1}$, . . . , $S_{1-4}$, $S_{2-1}$, . . . , $S_{2-4}$, . . . of each column group $S_1$, $S_2$, . . . is unambiguously associated with a respective output line $A_1$, $A_2$, $A_3$, $A_4$ and thus with a respective output amplifier $V_1$, $V_2$, $V_3$, $V_4$ in accordance with an association order, with the column groups $S_1$, $S_2$, . . . having mutually different association orders. The associations here are fixed electrical connections between the column lines $S_{1-1}$, . . . , $S_{1-4}$, $S_{2-1}$, . . . , $S_{2-4}$, . . . and the output lines $A_1$, $A_2$, $A_3$, $A_4$.

The following association orders are, for example present with the image sensor shown in FIG. 1: The 1st column line $S_{1-1}$, of the 1st column group $S_1$ is associated with the 1st output line $A_1$, the 2nd column line $S_{1-2}$ of the 1st column group $S_1$ is associated with the 3rd output line $A_3$, the 3rd column line $S_{1-3}$ of the 1st column group $S_1$ is associated with the 2nd output line $A_2$, and the 4th column line $S_{1-4}$ of the 1st column group $S_1$ is associated with the 4th output line $A_4$, as can be recognized with reference to association points Z. Furthermore, the 1st column line $S_{2-1}$ of the 2nd column group $S_2$ is associated with the 3rd output line $A_3$, the 2nd column line $S_{2-2}$ of the 2nd column group $S_2$ is associated with the 4th output line $A_4$, the 3rd column line $S_{2-3}$ of the 2nd column group $S_2$ is associated with the 2nd output line $A_2$, and the 4th column line $S_{2-4}$ of the 2nd column group $S_2$ is associated with the 1st output line $A_1$. Furthermore, the 1st column line $S_{3-1}$ of the 3rd column group $S_3$ is associated with the 3rd output line $A_3$, the 2nd column line $S_{3-2}$ of the 3rd column group $S_3$ is associated with the 2nd output line $A_2$, the 3rd column line $S_{3-3}$ of the 3rd column group $S_3$ is associated with the 4th output line $A_4$, and the 4th column line $S_{3-4}$ of the 3rd column group $S_3$ is associated with the 1st output line $A_1$.

The reading out of the image sensor in accordance with the invention shown in FIG. 1 will be described in the following.

The reading out takes place row-wise by application of corresponding address signals to the row selection circuit 11, with the row selection lines . . . , $Z_{m-1}$, $Z_m$ being addressed sequentially in rising order starting at a first row selection line located at an edge of the image sensor. Per row, the reading out takes place column group-wise, i.e. the pixels P associated with the respective selected row are read out column group for column group by a corresponding control of the column selection switches 19 by the column selection circuit 13. Since the association orders of the column groups $S_1$, $S_2$, . . . to the signal bus are different from one another, a scrambling of a ghost image can be achieved.

To further increase the scrambling, the control device 17 of the image sensor can be made to control the column selection switches 19 by the column selection circuit 13 such that the readout order of the column groups $S_1$, $S_2$, . . . is varied from row to row. For this purpose, the image sensor is configured such that the readout order of the column groups for at least some of the rows . . . , $Z_{m-1}$, $Z_m$ does not coincide with the arrangement order of the column groups $S_1$, $S_2$, . . . . The column groups $S_1$, $S_2$, . . . are therefore not read out in rising order, that is not first the 1st column group $S_1$, then the 2nd column group $S_2$, then the 3rd column group $S_3$, etc. The column groups $S_1$, $S_2$, . . . are rather read out more or less randomly, i.e., for example, first the 37th column group $S_{37}$, then the 7th column group $S_7$, then the 22nd column group, etc.

In a variant of the embodiment in accordance with FIG. 1, deviating from the representation in accordance with FIG. 1, always the same association order is provided, for example in the known manner of a unit matrix, for the different column groups $S_{71}, S_2, \ldots$. A scrambling of a ghost image is in this case exclusively achieved in that the readout order of the column groups $S_1, S_2, \ldots$ is varied for at least some of the rows, as described in the preceding paragraph.

Figure 2:
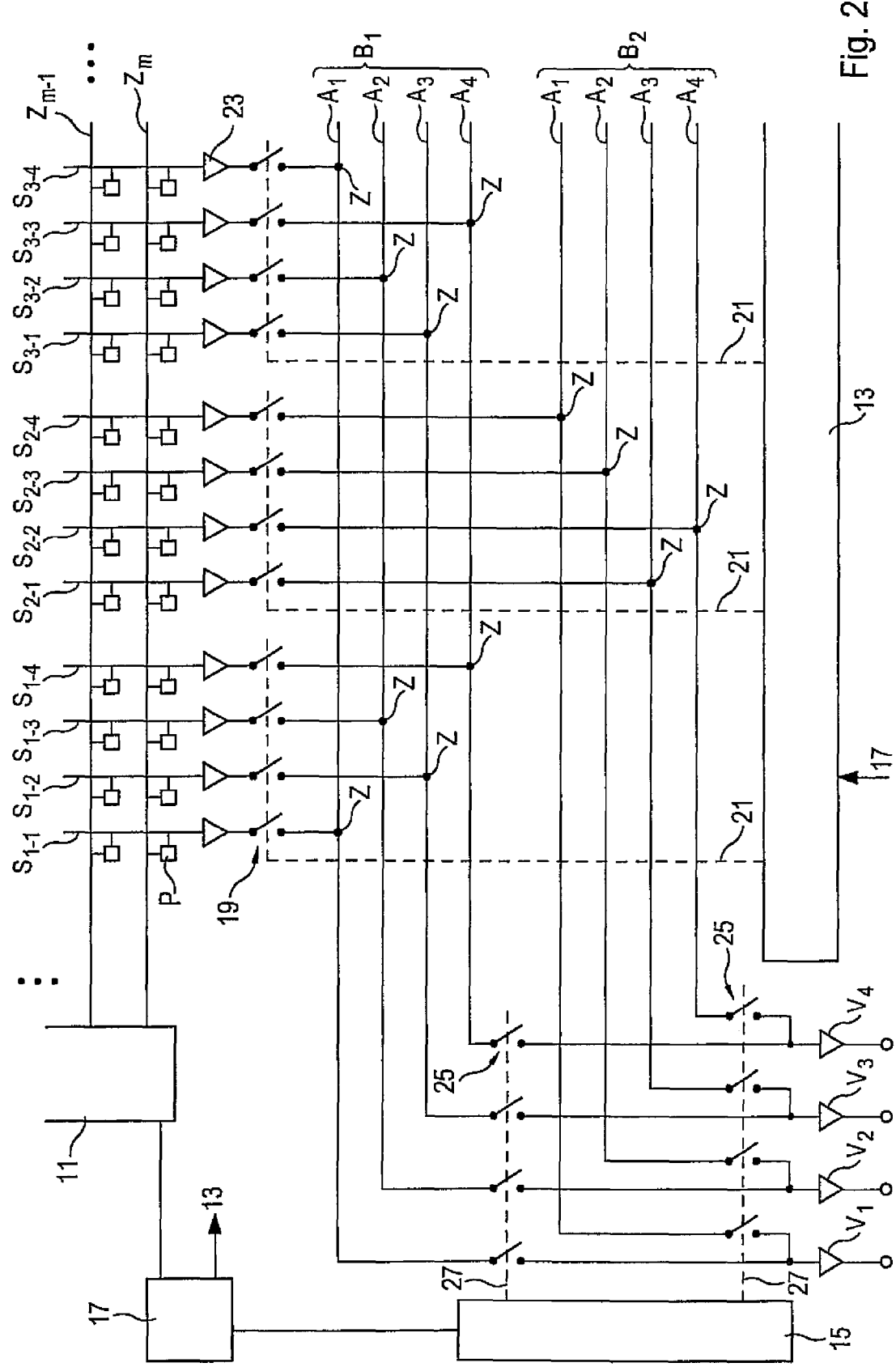
FIG. 2 a second embodiment of an image sensor in accordance with the invention.

With the image sensor shown in FIG. 2, unlike the image sensor shown in FIG. 1 which only has one signal bus, two signal buses $B_1, B_2$ are provided which each have four output lines $A_1, A_2, A_3, A_4$, with the odd number column groups $S_1, S_3, \ldots$ being associated with the first signal bus $B_1$ and the even number column groups $S_2, S_4, \ldots$ being associated with the second signal bus $B_2$. Generally, however, any other association of the column groups $S_1, S_2, S_3, \ldots$ with the signal buses $B_1, B_2$ is possible. The association orders of the individual column groups $S_1, S_2, S_3, \ldots$ correspond in another respect to the association orders shown in FIG. 1 such that the column groups $S_1, S_2, \ldots$ shown in FIG. 2 also have mutually different association orders.

Furthermore, a bus selection circuit 15 is provided which is controllable by the microcontroller 17 and which makes it possible via two bus selection control lines 27 to switch one of the two signal buses $B_1, B_2$ selectively to the output amplifiers $V_1, V_2, V_3, V_4$, with the 1st output line $A_1$ of the respective signal bus $B_1, B_2$ being switchable to the 1st output amplifier $V_1$, the 2nd output line $A_2$ of the respective signal bus $B_1, B_2$ to the 2nd output amplifier, the 3rd output line $A_3$ of the respective signal bus $B_1, B_2$ to the 3rd output amplifier, and the 4th output line $A_4$ of the respective signal bus $B_1, B_2$ to the 4th output amplifier. For this purpose, a separate bus selection switch 25 (of which only two are provided with a reference numeral) are provided for each of the output lines $A_1, A_2, A_3, A_4$, with the bus selection switches 25 of each signal bus $B_1, B_2$ being controllable via a respective common bus selection control line 27 by the bus selection circuit 15 so that the bus selection switches 25 of each bus $B_1, B_2$ can each be switched together.

An increase in the readout speed can be achieved by the provision of a plurality of buses $B_1, B_2$. While the signals of the pixels P of a selected column group $S_1, S_2, \ldots$ of a selected row $\ldots, Z_{m-1}, Z_m$ are switched via the one signal bus $B_1$ or $B_2$ to the output amplifiers $A_1, A_2, A_3, A_4$, the pixels P to be read out next can namely already be selected by means of the row selection circuit 11 and the column selection circuit 13. A settling of these signals on the respective other signal bus $B_2$ or $B_1$ is hereby enabled at an early time, namely before the application of the signals of the pixels P to be read out next at the output amplifiers $A_1, A_2, A_3, A_4$. Reading out can thus also take place at a high cycle frequency with longer settling times.

Analog to the control device of the image sensor in accordance with FIG. 1, the control device 17 of the image sensor in accordance with FIG. 2 can optionally also be made to control the column selection switches 19 by the column selection circuit 13 such that the readout order of the column groups $S_1, S_2, \ldots$ can be varied from row to row.

Figure 3:
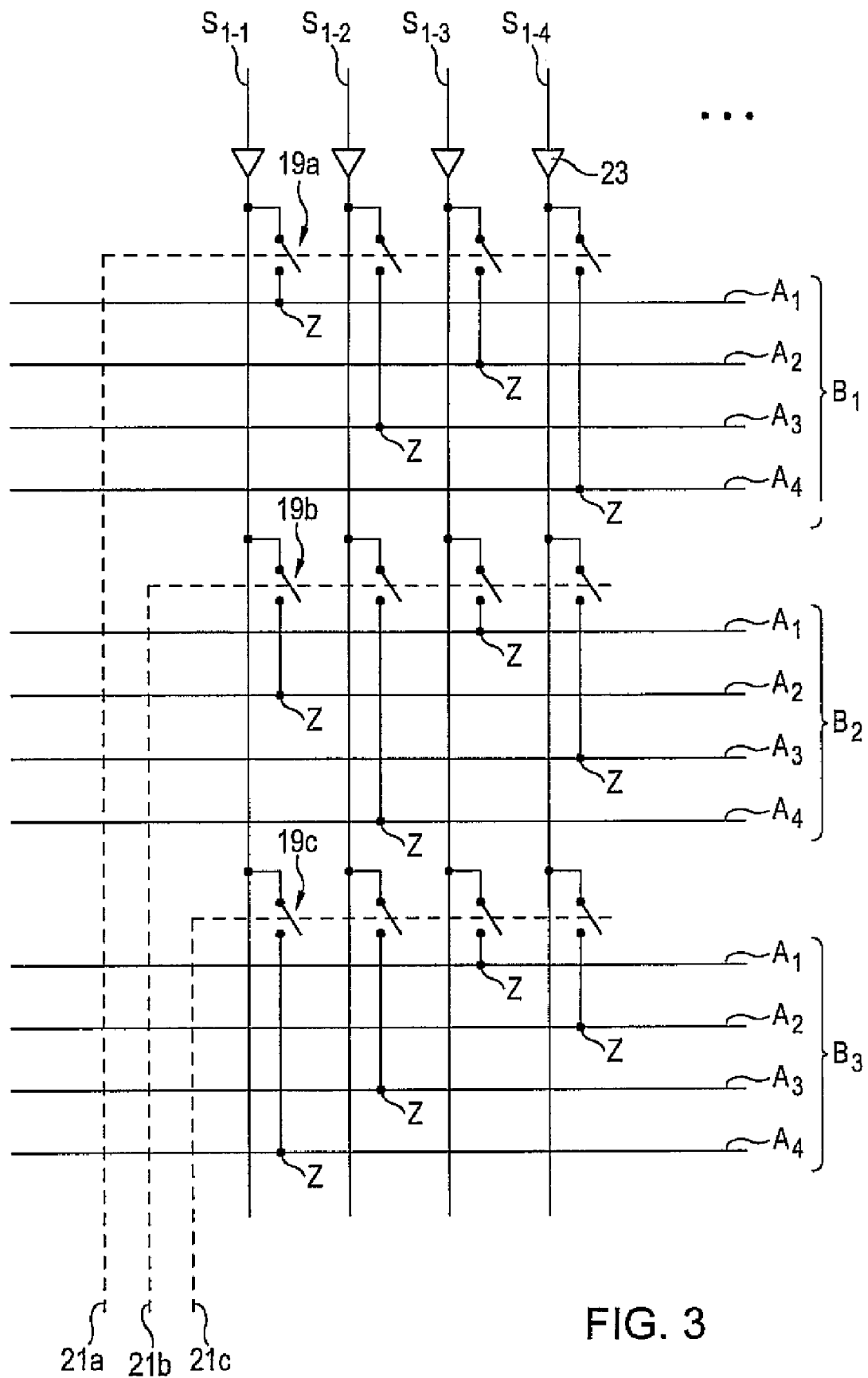
FIG. 3 a part of a third embodiment of an image sensor in accordance with the invention.

The image sensor in accordance with FIG. 3 has three signal buses $B_1, B_2, B_3$ and is only shown in the region of the association of the column group $S_1$ with the signal buses $B_1, B_2, B_3$, with the column group $S_1$ only being selected by way of example. The column group $S_1$, and equally the other column groups $S_2, S_3, \ldots$, not shown, is associated with each of the three signal buses $B_1, B_2, B_3$, with the association orders within each column group $S_1, S_2, \ldots$ being different.

Furthermore, first column selection switches 19a associated with the association points Z are provided for the 1st signal bus $B_1$, second column selection switches 19b for the 2nd signal bus $B_2$ and third column selection switches 19c for the 3rd signal bus $B_3$ (of which only one respective column selection switch 19a, 19b, 19c is provided with a reference numeral). These column selection switches 19a, 19b, 19c make it possible to switch the column groups $S_1, S_2, \ldots$ selectively in each case to a single one of the signal buses $B_1, B_2, B_3$, with the first column selection switches 19a being controllable via a common column selection control line 21a, the second column selection switches being controllable via a common column selection control line 21b, and the third column selection switches being controllable via a common column selection control line 21c by the column selection circuit not shown in FIG. 3 such that the column selection switches 19a, 19b or 19c can each be switched together.

In order, for example, to switch the 1st column group $S_1$ to the 1st signal bus $B_1$, the first column selection switches 19a are closed and the second and third column selection switches 19b, 19c are opened. In order to switch the 1st column group $S_1$ to the 2nd signal bus $B_2$, the second column selection switches 19a are closed and the first and third column selection switches 19a, 19c are opened. In order to switch the 1st column group $S_1$ to the 3rd signal bus $B_3$, the third column selection switches 19c are closed and the first and second column selection switches 19a, 19b are opened.

Consequently, in contrast to the associations in the image sensors shown in FIGS. 1 and 2, the column lines $S_{1-1}, \ldots, S_{1-4}, S_{2-1}, \ldots, S_{2-4}, \ldots$ are not fixedly associated with the output lines $A_1, A_2, A_3, A_4$. A number of different association orders which corresponds to the number of signal buses can rather be provided for each column group $S_1, S_2, \ldots$. A further scrambling is hereby possible since a plurality of different association orders can be realized within a single column group from which a respective one can be selected.

In another respect, the design of the image sensor in accordance with FIG. 3 corresponds to the design of the image sensor in accordance with FIG. 2, with bus selection switches, however, also being provided, analog to the first two signal buses $B_1, B_2$, for the third signal bus $B_3$ in the image sensor in accordance with FIG. 3, said bus selection switches being controllable via a common bus selection control line by the bus selection circuit which is not shown in FIG. 3 so that one of the three signal buses $B_1, B_2, B_3$ can selectively be switched to the output amplifiers not shown in FIG. 3.

The image sensor in accordance with FIG. 3 is designed for a readout sequence which only requires two signal buses, for example the two signal buses $B_1$ and $B_2$, for a complete reading out. The 3rd signal bus $B_3$ is a redundant signal bus which can be used as a replacement for one of the two signal buses $B_1, B_2$ if one of the two signal buses $B_1, B_2$ is defective.

The signal buses are preferably always switched to the output amplifiers in the same sequence on the reading out per row, i.e. the sequence is repeated cyclically within the row, with the sequence being varied from row to row. A further scrambling can hereby be achieved and the amplified signals can easily be associated with the respective pixels P to be able to correctly compensate the amplified signals to form a taken image. For example, with an image sensor having four signal buses $B_1, B_2, B_3, B_4$ (not shown) and, optionally, a redundant signal bus $B_5$ (not shown), the signal buses for the reading out of the column groups $S_1, S_2, \ldots$ of the first row $Z_1$ can be switched in sequential readout cycles in the order $B_1, B_3, F_4, B_2, \ldots$ to the output amplifiers $V_1, V_2, V_3, V_4$, for the reading out of the column groups $S_1, S_2, \ldots$ of the second row $Z_2$ in the order $B_1, B_4, B_2, B_3, \ldots$, etc. Preset more or less random orders can be used in this respect.

Figure 4:
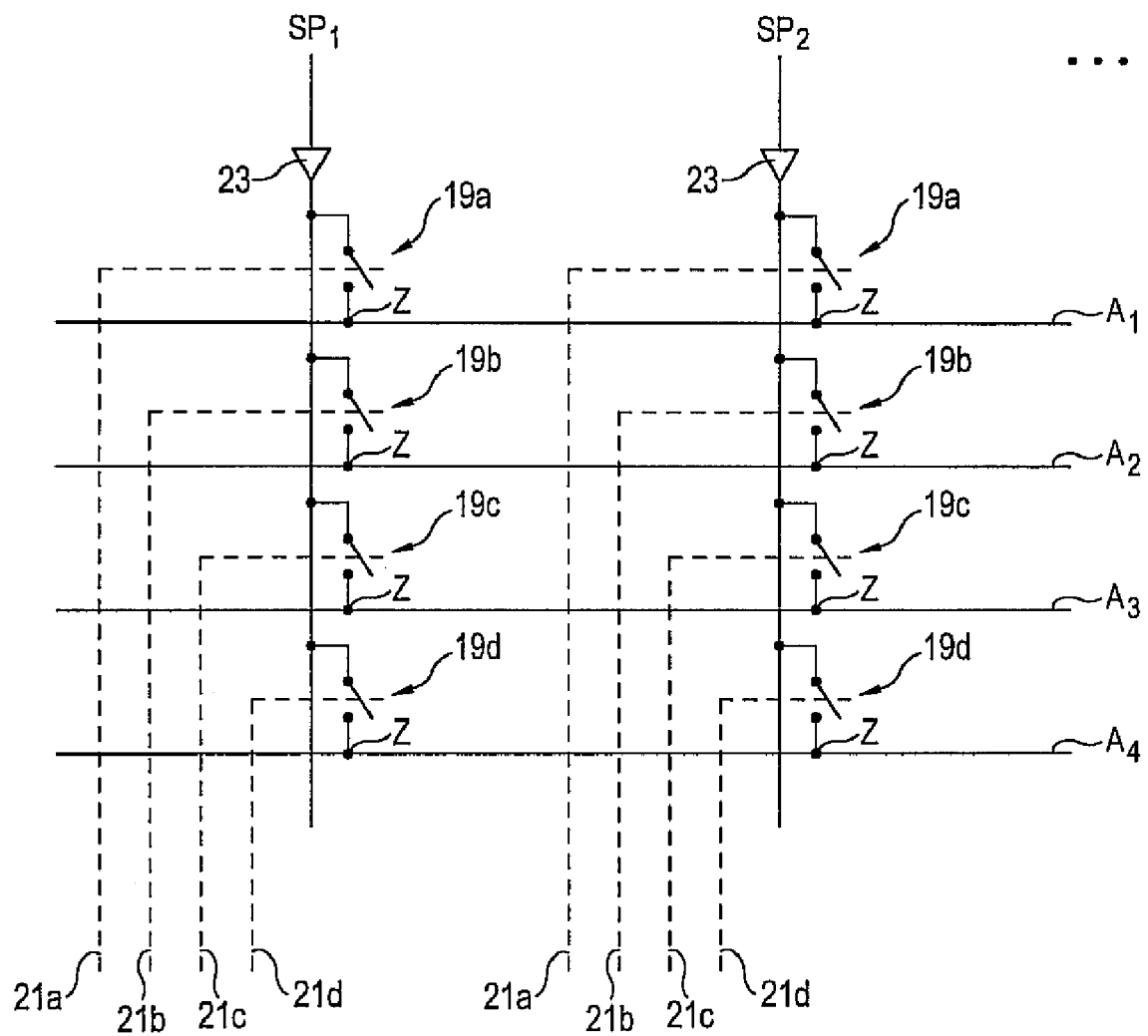
FIG. 4 a part of a fourth embodiment of an image sensor in accordance with the invention.

The image sensor in accordance with FIG. 4 is, unlike the image sensors in accordance with FIGS. 1 to 3, not divided into column groups and includes, in addition to a plurality of column lines $SP_1, SP_2, \ldots$, a single signal bus having four output lines $A_1, A_2, A_3, A_4$. The image sensor in accordance with FIG. 4 is only shown in the region of the associations of the first two column lines $SP_1$ and $SP_2$ with the output lines $A_1, A_2, A_3, A_4$, with the two column lines $SP_1$ and $SP_2$ only being shown by way of example. The column lines $P_1$ und $SP_2$, just like the other, not shown, column lines $SP_3$, $SP_4, \ldots$, are associated with each of the four output lines $A_1$, $A_2, A_3, A_4$.

For this purpose, there are provided, in each case associated with the column lines $SP_1, SP_2, \ldots$, first column selection switches 19a for the 1st output line $A_1$, second column selection switches 19b for the 2nd output line $A_2$, third column selection switches 19c for the 3rd output line $A_3$, and fourth column selection switches 19d for the 4th output line $A_4$. These column selection switches 19a, 19b, 19c, 19d make it possible in the column selection circuit not shown in FIG. 4 to switch the column lines $SP_1, SP_2, \ldots$ via respective column selection control lines 21a, 21b, 21c, 21d in each case selectively to a single one of the output lines $A_1, A_2, A_3, A_4$.

In order, for example, to switch the 1st column line $SP_1$ to the 1st output line $A_1$, the first column selection switch 19a is closed and the second, the third and the fourth column selection switches 19a, 19c, 19d are opened again. In order to switch the 1st column line $SP_1$ to the 2nd output line $A_2$, the second column selection switch 19b is closed and the first, the third and the fourth column selection switches 19a, 19c, 19d are opened again. In order to switch the 1st column line $SP_1$ to the 3rd output line $A_3$, the third column selection switch 19c is closed and the first, the second and the fourth column selection switches 19a, 19b, 19d are opened again. In order to switch the 1st column line $SP_1$ to the 4th output line $A_4$, the fourth column selection switch 19d is closed and the first, the second and the third column selection switches 19a, 19b, 19c are opened.

Analog to the associations in the image sensor shown in FIG. 3, in the image sensor in accordance with FIG. 4, the column lines $SP_1, SP_2, \ldots$ are not fixedly associated with the output lines $A_1, A_2, A_3, A_4$. Each column line $SP_1, SP_2, \ldots$ can rather be associated with each of the output lines $A_1, A_2, A_3, A_4$. A scrambling can hereby be achieved in a simple manner, for example in that the columns along a respective row are switched to the amplifiers in a more or less random order. Alternatively or additionally, the readout order in which the column lines $SP_1, SP_2, \ldots$ are sequentially switched to the output amplifiers can be varied with respect to the arrangement order of the columns along the row.

In addition, based on the arrangement shown in FIG. 4, a defective output can be bypassed in that the corresponding output line $A_1$ is no longer used.

In another respect, the design of the image sensor in accordance with FIG. 4 corresponds to the design of the image sensor in accordance with FIG. 1, with the column lines $SP_1$, $SP_2, \ldots$, however, contrary to FIG. 1, not being divided into column groups.

It is generally also possible to modify the image sensor in accordance with FIG. 4 such that a plurality of signal buses are provided (not shown), with each column line being associated with each of the signal buses via corresponding column selection switches, as explained above with respect to FIG. 3. Alternatively, it is, however, also possible with a plurality of signal buses for each column line to be associated with each of the signal buses, with the respective column line, however, not being associated with all of the output lines of the respective signal bus.

In FIGS. 1 to 4, the signals of the pixels P of the respective column of the respective column group $S_1, S_2, \ldots$ are applied in the form of voltage signals at the output amplifiers $V_1, V_2$, $V_3, V_4$ in order subsequently to be converted in each case by means of an A/D converter (not shown) into a respective digital value.

The pixels P of the image sensor are preferably active pixels in which the charge signals are already converted into voltage signals in the pixels P. The pixels P can, however, generally also be made as passive pixels in which the conversion of the charge signals into voltage signals takes place on the signal path from the pixels P to the output amplifiers $A_1$, $A_2, A_3, A_4$. The column selection switches 19 and the bus selection switches 25 can, for example, be CMOS transistors.

The use of four output lines, four column lines per column group, four output amplifiers or of two, three, four or five signal buses is only of an exemplary nature. Any desired other number of output lines, column lines per column group, output amplifiers or signal buses can generally be provided.

The invention claimed is:

1. An image sensor for electronic cameras, comprising
   a plurality of light sensitive pixels (P) arranged in rows ($\ldots, Z_{m-1}, Z_m$) and columns ($S_{1-1}, \ldots, S_{1-4}, S_{2-1}, \ldots, S_{2-4}, \ldots$);
   a number of output amplifiers ($V_1, V_2, V_3, V_4$);
   a switching device (11, 13), for selectively switching the pixels (P) of one of the rows ($\ldots, Z_{m-1}, Z_m$) to the number of output amplifiers ($V_1, V_2, \ldots, V_4$); and
   a control device (17) for controlling the switching device (11, 13),
   characterized in that
   the image sensor is made such that an order in which the plurality of light sensitive pixels (P) are switched to the output amplifiers ($V_1, V_2, V_3, V_4$) is varied with respect to the order in which the plurality of light sensitive pixels (P) are arranged along a row ($\ldots, Z_{m-1}, Z_m$) of the image sensor;
   wherein the columns ($S_{1-1}, \ldots, S_{1-4}, S_{2-1}, \ldots, S_{2-4}, \ldots$) are divided into a plurality of column groups ($S_1$, $S_2, \ldots$); and in that the number of the output amplifiers ($V_1, V_2, V_3, V_4$) corresponds to the number of the columns ($S_{1-1}, \ldots, S_{1-4}, S_{2-1}, \ldots, S_{2-4}, \ldots$) of a column group ($S_1, S_2, \ldots$), with the number of columns ($S_{1-1}, \ldots, S_{1-4}, S_{2-1}, \ldots, S_{2-4}, \ldots$) of each column group ($S_1, S_2, \ldots$) being associated with the number of output amplifiers ($V_1, V_2, V_3, V_4$) in accordance with an association order, and with mutually different association orders being provided for at least some of the plurality of column groups ($S_1, S_2, \ldots$).

2. An image sensor in accordance with claim 1, characterized in that
   all of the column groups ($S_1, S_2, \ldots$) have the mutually different association orders.

3. An image sensor in accordance with claim 1, characterized in that
   the mutually different association orders are provided for adjacent column groups ($S_1, S_2, \ldots$).

4. An image sensor in accordance with claim 1, characterized in that
   the image sensor has at least one signal bus ($B_1, B_2, B_3$) each of which includes a number of output lines ($A_1, A_2$, $A_3, A_4$) which corresponds to the number of the output amplifiers ($V_1, V_2, V_3, V_4$), with the columns ($S_{1-1}, \ldots$, $S_{1-4}, S_{2-1}, \ldots, S_{2-4}, \ldots$) of a respective column group ($S_1, S_2, \ldots$) being connected or connectable to different ones of the output lines ($A_1, A_2, A_3, A_4$) of the at least one signal bus ($B_1, B_2, B_3$) at predetermined association points (Z), with the association order being preset by the arrangement of the predetermined association points.

5. An image sensor in accordance with claim 1, characterized in that the image sensor has a plurality of signal buses ($B_1, B_2, B_3$) which each includes a number of output lines ($A_1, A_2, A_3, A_4$) which corresponds to the number of output amplifiers ($V_1, V_2, V_3, V_4$), with the switching device (15) being made to switch the output lines ($A_1, A_2, A_3, A_4$) of a respective one of the plurality of signal buses ($B_1, B_1, B_3$) selectively to the output amplifiers ($V_1, V_2, V_3, V_4$).

6. An image sensor in accordance with claim 5, characterized in that the control device (17) is made to control the switching device (15) such that two column groups ($S_1, S_2, \ldots$) switched sequentially to the output amplifiers ($V_1, V_2, V_3, V_4$) are switched via different ones of the signal buses ($B_1, B_2, B_3$) to the output amplifiers ($V_1, V_2, V_3, V_4$).

7. An image sensor in accordance with claim 5, characterized in that at least some of the column groups ($S_1, S_2, \ldots$) are associated with a plurality of signal buses ($B_1, B_2, B_3$), with the association orders within each such column group ($S_1, S_2, \ldots$) being different for the plurality of signal buses ($B_1, B_2, B_3$).

8. An image sensor in accordance with claim 5, characterized in that the control device (17) is made to control the switching device (15) such that the signal buses ($B_1, B_2, B_3$) from row ($\ldots, Z_{m-1}, Z_m$) to row ($\ldots, Z_{m-1}, Z_m$) are switched to the output amplifiers ($V_1, V_2, V_3, V_4$) in a different order.

9. An image sensor in accordance with claim 5, characterized in that the control device (17) is made to control the switching device (11, 13) such that, within a respective column group ($S_1, S_2, \ldots$), the columns ($S_{1-1}, \ldots, S_{1-4}, S_{2-1}, \ldots, S_{2-4}, \ldots$) from row ($\ldots, Z_{m-1}, Z_m$) to row ($\ldots, Z_{m-1}, Z_m$) are switched to different signal buses ($B_1, B_2, B_3$).

10. An image sensor in accordance with claim 5, characterized in that the control device (17) is made to completely read out the image sensor using a predetermined number of signal buses ($B_1, B_2$), with the image sensor having more signal buses ($B_1, B_2, B_3$) than the predetermined number of signal buses.

11. An image sensor in accordance with claim 1, characterized in that the columns ($S_{1-1}, \ldots, S_{1-4}, S_{2-1}, \ldots, S_{2-4}, \ldots$) are divided into a plurality of column groups ($S_1, S_2, \ldots$) and the number of the output amplifiers ($V_1, V_2, V_3, V_4$) corresponds to the number of columns ($S_{1-1}, \ldots, S_{1-4}, S_{2-1}, \ldots, S_{2-4}, \ldots$) of a column group ($S_1, S_2, \ldots$), with the column groups ($S_1, S_2, \ldots$) being arranged in accordance with an arrangement order relative to one another and the control device (17) being made to control the switching device (11, 13) such that the column groups ($S_1, S_2, \ldots$) are switched for each row in accordance with a respective readout order sequentially to the output amplifiers ($V_1, V_2, V_3, V_4$), with the respective readout order of the column groups ($S_1, S_2, \ldots$) being different from the arrangement order of the column groups ($S_1, S_2, \ldots$).

12. An image sensor for electronic cameras, comprising a plurality of light sensitive pixels (P) arranged in rows ($\ldots, Z_{m-1}, Z_m$) and columns ($S_{1-1}, \ldots, S_{1-4}, S_{2-1}, \ldots, S_{2-4}, \ldots$);

a number of output amplifiers ($V_1, V_2, V_3, V_4$);

a switching device (11, 13), for selectively switching the pixels (P) of one of the rows ($\ldots, Z_{m-1}, Z_m$) to the number of output amplifiers ($V_1, V_2, \ldots, V_4$); and a control device (17) for controlling the switching device (11, 13), characterized in that the image sensor is made such that an order in which the plurality of light sensitive pixels (P) are switched to the output amplifiers ($V_1, V_2, V_3, V_4$) is varied with respect to the order in which the plurality of light sensitive pixels (P) are arranged along a row ($\ldots, Z_{m-1}, Z_m$) of the image sensor;

wherein the columns ($S_{1-1}, \ldots, S_{1-4}, S_{2-1}, \ldots, S_{2-4}, \ldots$) are divided into a plurality of column groups ($S_1, S_2, \ldots$) and the number of the output amplifiers ($V_1, V_2, V_3, V_4$) corresponds to the number of columns ($S_{1-1}, \ldots, S_{1-4}, S_{2-1}, \ldots, S_{2-4}, \ldots$) of a column group ($S_1, S_2, \ldots$), with the column groups ($S_1, S_2, \ldots$) being arranged in accordance with an arrangement order relative to one another and the control device (17) being made to control the switching device (11, 13) such that the column groups ($S_1, S_2, \ldots$) are switched for each row in accordance with a respective readout order sequentially to the output amplifiers ($V_1, V_2, V_3, V_4$), with the respective readout order of the column groups ($S_1, S_2, \ldots$) being different from the arrangement order of the column groups ($S_1, S_2, \ldots$).

13. An image sensor in accordance with claim 12, characterized in that the control device (17) is made to control the switching device (11, 13) such that the readout order is varied for at least some of the rows from row ($\ldots, Zm-1, Zm$) to other row ($\ldots, Zm-1, Zm$).

* * * * *